Patented June 18, 1935

2,005,697

UNITED STATES PATENT OFFICE 2,005,697

MANUFACTURE OF IRON BLUES

Samuel Felton Grove, Swarthmore, Pa., assignor to Henry Bower Chemical Manufacturing Company, Philadelphia, Pa., a corporation of Pennsylvania No Drawing. Application August 31, 1933, Serial No. 687,727

23 Claims. (Cl. 23—77)

This invention relates to the manufacture of colors of the general type commercially known as "iron blues", which are believed to be in the nature of ferric ammonium ferro-cyanides, and are exemplified by Prussian blue, bronze blue, Chinese blue, and milori blue, as well as by a soluble blue used for laundry purposes. Besides improvements and economies in manufacture, the new process affords blues of improved quality as compared with those heretofore on the market: e. g., the product settles and filters more rapidly when washed during manufacture, and is of much softer texture when finished, so as to grind more easily for the manufacture of inks or other purposes. These superior physical properties of my blue seem to be related to its apparently less colloidal nature: i. e., on the filter, the solution and the wash water pass through quite readily; and when dried, it occupies more space than that made in the usual way, and is brought to a very fine powder with much less grinding. Various other features and advantages of the invention will appear from the following description. So far as novel over the art, indeed, all the features hereinafter set forth are of my invention.

In the manufacture of iron blues as heretofore practiced, solutions of a (soluble) alkali ferrocyanide and of a (soluble) ferrous salt are brought together in a tank with agitation. Their reaction together gives a bluish-white precipitate of so-called ferrous alkali ferrocyanide, which is converted to a darker blue (so-called ferric alkali ferrocyanide) with oxidizing agents such as dichromates, chlorates, chlorine, ferric salts, etc. The depth of color and other characteristics of the final product are largely determined and regulated by the temperatures and concentrations of the several solutions, by the relative proportions of ferrocyanide, ferrous salt, and oxidizer used, by the particular oxidizer, and by the proportions and kind of acid which is also generally used. After the oxidation, the product may be washed (as by decantation several times) until sufficiently free of impurities, and then filter-pressed. The filter cake may be broken up and dried in tray driers, when it is ready for the grinding or other treatment required for the particular use to which it is to be put.

The color qualities of the finished blue are greatly influenced by the alkali in it, blues containing ammonium or potassium being generally superior to those containing sodium merely. While, therefore, sodium ferrocyanide is commonly used with the ferrous salt (such as copperas), yet when this is done ammonium or potassium is nevertheless introduced into the blue by adding a soluble ammonium or potassium salt, such as ammonium sulphate or potassium chloride, either to the sodium ferrocyanide solution or to the ferrous salt solution,—the typical reaction being:

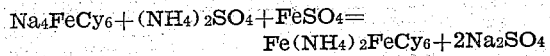

$$Na_4FeCy_6 + (NH_4)_2SO_4 + FeSO_4 = Fe(NH_4)_2FeCy_6 + 2Na_2SO_4$$

Thus ammonium or potassium enters and forms blue molecules, in preference to sodium, to a sufficient extent to give the blue the desired qualities,—although some small quantity of sodium also enters and forms blue molecules, owing to the mass action in solution. In some cases, also, blues are made directly from potassium ferrocyanide ($K_4FeCY_6 3H_2O$) and a ferrous salt. In general potassium and sodium-potassium blues are similar to ammonium and sodium-ammonium blues, the potassium behaving similarly to the ammonium.

In general, care is necessary in bringing together the alkali ferrocyanide and ferrous salt solutions, since if they come together in large liquid masses, local excess of one or the other solution will result in precipitates of varying composition, quite different from what is desired. The solutions employed should not be too concentrated.

I have discovered that the final product can be improved, and other advantages realized, by modification of the process above outlined. For this purpose, I preferably carry on the process, or a portion thereof, under the influence or effective presence of an auxiliary material, which may subsequently be eliminated from the product.

The stages at which the properties of the final product can thus be favorably affected appear to extend from the initial formation or precipitation of the ferrous alkali ferrocyanide into the washing of the oxidized precipitate or blue to free it of impurities,—such as undesired reaction products and/or unreacted residues of the ingredients or reagents employed. The greatest positive effects of the auxiliary material seem to be produced during the precipitation of the ferrous alkali ferrocyanide and its "digestion" (as hereinafter described), before oxidation: i. e., when the introduction of auxiliary material is deferred till after the digestion, considerably less than the maximum benefit is generally obtained; and if it is not introduced till after oxidation, then the benefit is comparatively small. Even during the later stages of the process, nevertheless, the auxiliary material seems to have important beneficial effects, though in a rather negative way: i. e., if after being introduced as precipitation begins, the auxiliary material is subsequently washed out and eliminated from the blue before other impurities have been sufficiently removed, then the blue is not so good as it might be. Sparingly soluble auxiliary material has, therefore, the advantage that less of it need be used to assure its presence with the blue as long as needed. In short some benefit can be secured by the presence of the auxiliary material at and from any stage of the process where the final characteristics of the blue are undetermined, up until they have become fixed.

The facts just stated suggest that the auxiliary material may produce its effects as an offset to some otherwise unfavorable influence (as of impurities) on the formation and stability of the product. I incline strongly to the opinion that the principal benefits are due to auxiliary material in solution, and particularly to its metal ions; and that solid particles of such material that may be present are important only as a "reserve" to go into solution on dilution, and during the washing out of impurities from the blue. It may be that the quick-settling properties of my blue (as hereinbefore described) are due to some neutralization of electrical charges on the blue particles by the auxiliary material in solution or its ions, so that these particles are no longer kept in suspension in the water by mutual repulsion due to such charges. The softness of my blue may be due to a "skin" formed on the individual blue particles by the auxiliary material, which allows them to absorb water and swell without disrupting, so that the final dried particles are porous; and this may also explain their quicker settling and filtering. However, theories are not essential to the successful practice of my invention; and I therefore express no definite theoretical views.

The auxiliary materials at present preferred are salts or compounds of metals of "Group II" in the periodic system of elements, and particularly its sub-group containing magnesium and calcium, which are sufficiently soluble to be eliminated from the blue by washing, but which do not react under practical conditions with the principal ingredients used (ferrous salt, alkali ferrocyanide, and oxidizer) or with the desired products (ferrous alkali ferrocyanide and/or ferric alkali ferrocyanide),—nor interfere in any way with the desired precipitation and reactions. To such compounds of such metals I refer briefly as "metallic salts of the magnesium-calcium class", and to the metals themselves as "metals of the magnesium-calcium class". Beryllium, obviously, is at present excluded from practical consideration by prohibitive cost, and strontium and barium are rather excluded by general relative insolubility of their compounds. An objection against compounds of the zinc-cadmium-mercury sub-group of Group II is their reaction with the ferrous alkali ferrocyanide. Magnesium and calcium compounds, however, are both of great practical importance.

Any soluble magnesium and/or calcium salts can conveniently be used (provided their acid radicals will not react or form insoluble precipitates with the other substances to be employed, or act chemically on the main products), such as sulphates, chlorides, etc.,—including double salts of magnesium and/or calcium with other alkalies, or with one another. Ferrocyanides, when obtainable at reasonable cost, offer the special advantage that they do not introduce any additional radical into the solution, to give rise to impurities that must afterward be gotten rid of, but do take the place of an equivalent amount of sodium or other alkali ferrocyanide for the main reaction. But for their greater cost, such magnesium and/or calcium ferrocyanides might even be used as complete substitutes for the usual sodium ferrocyanide. Neither magnesium nor calcium is chemically combined in the blues made with their salts, to any appreciable extent, especially if sufficient alkali salts are present during the formative reaction; and neither interferes with the precipitation and other reactions.

It is to be noted that whatever the magnesium or calcium salts employed, their actual salts in the solution will usually be sulphates (largely or mainly), owing to the fact that ferrous sulphate and sulphuric acid are generally used in the commercial manufacture of iron blues. By using other suitable iron salts and acids in lieu of the usual copperas and sulphuric acid,—such as ferrous chloride and hydrochloric acid, for example,—the actual presence of any desired corresponding magnesium or calcium salts during the process can be realized. However, such measures to secure the presence of other acid radicals will not here be considered in detail, but rather the use of magnesium and calcium salts in the more usual procedures of iron blue manufacture. It appears to be the metal of the auxiliary salt that is specially influential, rather than its acid radical or ions.

Individually, magnesium and calcium salts behave somewhat differently, and afford corresponding special advantages. With magnesium salts, the precipitate of ferrous alkali ferrocyanide is rather more curdy, and the resulting blue filters more rapidly than that made with calcium salts; but under like conditions in other respects, the blues obtained with calcium salts are somewhat "deeper" or darker than those with magnesium salts. Though both are rather sparingly soluble, calcium sulphate is rather less soluble than magnesium sulphate; and so while less of it is required, more water for washing is needed to eliminate it from the blue than for the same weight of magnesium sulphate. By using magnesium and calcium together, blues superior to those obtained with either alone can be produced: e. g., blues produced with a suitable mixture of calcium and magnesium salts have the quick filtering properties of "magnesium blues", and are also as dark and strong as "calcium blues",—to use an arbitrary but obvious distinctive terminology.

Among soluble magnesium salts which may conveniently be used for the purposes of my invention, I prefer for cheapness and commercial availability the sulphate $MgSO_4$, either anhydrous, or in any of its hydrated forms, such as Epsom salt, $MgSO_4 \cdot 7H_2O$, and the chloride $MgCl_2$ which may be in the hydrated form $MgCl_2 \cdot 6H_2O$. Magnesium ferrocyanide or any of the double magnesium alkali ferrocyanides are very desirable, if obtainable at a reasonable price.

Among soluble calcium salts which may conveniently be used I should particularly mention calcium sulphate, $CaSO_4$, and calcium chloride, $CaCl_2$. Calcium ferrocyanide ($Ca_2FeCy_6$) has the special advantages already indicated above; and sparingly soluble double ferrocyanides of an alkali and another metal—as of calcium and ammonium or potassium ($Ca(NH_4)_2FeCy_6$ or $CaK_2FeCy_6$), or magnesium and ammonium or potassium—offer special advantages as set forth in my application Serial No. 629,503, filed August 29, 1932. All such other calcium salts in effect usually yield calcium sulphate by reaction or combination with sulphate ($SO_4$) ions in the solution, as explained above. (A similar action of course usually occurs when magnesium salts are used, but may be less complete because magnesium sulphate is more soluble than calcium sulphate.)

As already indicated, calcium sulphate may be used directly, in almost any of its several forms, in a suitably fine state of division: e. g., the dihydrate, $CaSO_4 \cdot 2H_2O$, either in the form of natural gypsum (finely ground), or as obtained by precipitating a calcium salt from solution with sulphuric acid or a soluble sulphate; anhydrous calcium sulphate, $CaSO_4$, particularly the natural anhydrite; or the hemi-hydrate, $CaSO_4 \cdot \tfrac{1}{2}H_2O$, known in commercial forms as "plaster of Paris". For any form of solid calcium sulphate, good results can be obtained with a particle fineness of 95% or more through 200 mesh. The relatively anhydrous form ($CaSO_4 \cdot \tfrac{1}{2}H_2O$) is at present preferred, partly because commercially available in a finely divided state as plaster of Paris, and partly for other reasons. A feature of some importance is its greater solubility as compared with the dihydrate, and its rather slow transformation into the latter when dissolved. Specifically, the hemi-hydrate or plaster of Paris is about five times as soluble as the dihydrate. Hence the initially dissolved hemi-hydrate gradually hydrates into the dihydrate while in solution; the solution thus becomes supersaturated, if sufficient hemi-hydrate has been used; and the excess of the dihydrate precipitates out as such. Plaster of Paris gives a softer blue than does gypsum, with greater filtering speed,—less colloidal and more porous.

In the ordinary practice of blue making with copperas and sulphuric acid, calcium salts have an advantage from the slight solubility of calcium sulphate, even in the presence of acid, and especially sulphuric acid. Thus a comparatively small amount of calcium sulphate suffices for the best results, and almost any amount gives some benefit. Its ultimate solubility in water (which varies, however, inversely with the temperature of the water) is only about 2 grams per liter, and such a saturated solution has a very decided effect on the physical properties of the blue. If more calcium sulphate than this is provided, the solution will be supersaturated with it, and the excess will gradually crystallize out as the dihydrate, $CaSO_4 \cdot 2H_2O$, in the form of very small crystals.

In carrying out my invention, substantially the same procedure heretofore used in making iron blues (as outlined above) may be followed, with the addition of the auxiliary material at a suitable stage.

When a magnesium salt is used alone as the auxiliary material, it is preferably added to the ferrocyanide solution in the precipitating tank; and into this is run the other solution, containing ferrous sulphate and a salt of the desired alkali (such as ammonium or potassium sulphate or chloride), with more or less (sulphuric) acid. This is all done with continual agitation of the liquid in the tank. Such a method as this is preferred because it assures the presence of ample auxiliary material throughout the precipitation. If, on the other hand, the auxiliary material is added to the ferrous sulphate before the latter is run into the tank containing the ferrocyanide solution, then precipitation will start without the presence of enough magnesium sulphate for the best results. Nevertheless, the benefits of the invention can be realized to a very considerable degree in this way: indeed, good (but less satisfactory) results can even be obtained by bringing the ferrocyanide and ferrous sulphate solutions together (with the desired alkali salt, acid, and the like) as heretofore, without any auxiliary material, and only adding the auxiliary material to the contents of the precipitating tank, with agitation, after formation of the ferrous alkali ferrocyanide precipitate, at the beginning of the "digestion". However, it appears to be harder to alter the once-formed ferrous alkali ferrocyanide precipitate to the superior (less colloidal) form than to cause the precipitate to assume the superior form in the first place.

When a calcium salt is used alone, a like procedure may be followed.

When a mixture of magnesium and calcium salts is used, there are several ways of obtaining good results. If a soluble or sparingly soluble calcium salt is used, such as the chloride, ferrocyanide, or calcium alkali ferrocyanide, it is preferably added to the ferrocyanide solution in the precipitating tank; and the magnesium salt is preferably added to the ferrous sulphate solution and thoroughly mixed with it before the ferrous sulphate and ferrocyanide solutions are mixed together,—which may be done, as before, by running the ferrous sulphate solution into the tank while agitating the liquid in the latter. As a general rule of procedure, this avoids all risk of premature precipitation of calcium sulphate, which would at once occur if a soluble calcium salt and magnesium sulphate (say) were brought together in the ferrocyanide solution. However, when magnesium chloride (say) is used with a soluble calcium salt, they may both be added to the ferrocyanide solution; and the like may be done when solid calcium sulphate (gypsum, plaster of Paris, or anhydrite) is used,—even when the magnesium salt is the sulphate.

Good (but less satisfactory) results are also obtained if solid calcium sulphate and a soluble magnesium salt (even the sulphate) are both added to the ferrous sulphate solution before precipitation by intermixture of the ferrous sulphate and ferrocyanide solutions,—or are even added directly after these two solutions are mixed together.

As or after the ferrocyanide and ferrous sulphate solutions are brought together, the mix should start to thicken into a slurry: i. e., if only about the amount of water heretofore customary is used in the ferrocyanide and ferrous sulphate solutions, the mix reaches the consistency of a slurry at a comparatively early stage of the reaction. The auxiliary material augments this thickening action, so that the slurry containing the auxiliary material becomes much thicker than one made without it according to the prior art. If, in either case, more water is added gradually as the mix thickens, still further thickening will occur, especially if the temperature of the mix is raised while the water is being added, or just before. In this way, the volume of the mix can be increased some 30 to 50% by adding more and more water, before continued addition of water begins to have a thinning effect. When water is added progressively, as here indicated, more water will ultimately be taken up into the slurry than if the same total amount of water were initially included in the solutions as originally brought together in the precipitating tank.

The thickening thus produced seems to be connected with the desirable soft qualities of the blue obtained: i. e., the thicker the slurry becomes, the softer will be the blue. The final product also seems to be better when the initial vigorous agitation is moderated somewhat after the mix reaches the consistency of a slurry, and kept fairly moderate during the further progress of the reaction and thickening, and during the subsequent steps or operations. The actual proportion of water required may vary somewhat according to the quality (wet or dry) of the steam used to heat the batch during and after mixing, if the steam is blown or injected into the mix, as usual in such cases, and according to the size of the batch. If the steam is wet, less initial water will be needed; and if the batch is small, more steam will be condensed in it, proportionately, than in a large batch, so that, again, less initial water will be needed. The slurry should not be allowed to become so thick as to prevent the oxidizer subsequently added from being easily mixed in and evenly distributed through the batch, nor so thick that it will be locally overheated by the steam jets, if steam jets are used to heat it.

The necessary or best proportions of auxiliary material to other ingredients will depend a good deal on how the product is washed. In general, the minimum for the best results can be used when the blue is transferred to the filter without any addition of water subsequent to the final stage (oxidation) in the making of the blue, and the washing is all done at the filter.

For a blue that washes readily, and using magnesium salts alone as auxiliary material, 10 parts by weight of Epsom salt (MgSO$_4$·7H$_2$O) per 100 parts of sodium ferrocyanide (NaFeCy$_6$·10H$_2$O) used would be required; or a chemically equivalent amount of magnesium chloride or other magnesium salt.

For a blue that washes less readily, the batch may be "flooded" with water to about double the volume of the batch after precipitation and oxidation; allowed to settle, and decanted and thus freed of the supernatant liquor; and then transferred to a filter press and washed with the minimum quantity of water that will free it of soluble salts. For such a blue thus washed, about double the amount of auxiliary material above stated may be required: i. e., about 20 parts of Epsom salt per 100 parts of sodium ferrocyanide; or a chemically equivalent amount of any other magnesium salt. For a blue requiring two or more "floodings", somewhat more magnesium salt should be used, to keep the blue from assuming a more colloidal, slower filtering, and harder form.

With calcium salts alone as auxiliary material, and a similar procedure, an easily washed blue would require for the best results about 5 parts by weight of 100% CaCl$_2$ per 100 parts sodium ferrocyanide, or about 8 parts calcium sulphate dihydrate, or about 6.5 parts plaster of Paris,—or a chemically equivalent amount of any other calcium salt. For a less readily washable blue, washed as indicated above with a single flooding and decantation, about double these proportions of auxiliary material may be required; and where two or more floodings are necessary to wash the blue, still more auxiliary material will be needed.

Using for the auxiliary material a mixture of magnesium and calcium salts, and washing as indicated above, the following proportions may be used per 100 parts by weight of sodium ferrocyanide: For an easily washed blue, about 5 parts by weight of magnesium sulphate (MgSO$_4$·7H$_2$O) or the chemical equivalent in other magnesium salts, and about 2.2 parts by weight of 100% CaCl$_2$, or the chemical equivalent of calcium sulphate; and for a less readily washable blue, washed with a single flooding and decantation, about double these quantities, or about 10 parts MgSO$_4$·7H$_2$O and about 4.5 parts of 100% CaCl$_2$; or their chemical equivalents in other magnesium and calcium salts, respectively. For a blue washed with more than one flooding, the same amount of magnesium salt as for a single flooding may preferably be used; but the amount of calcium salt used will preferably be increased so that some solid calcium sulphate will be present after the last decantation, to dissolve and protect the blue in the final washing operations.

When calcium-ammonium ferrocyanide is used, the main reaction is:

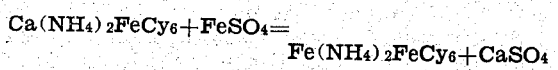

$$\mathrm{Ca(NH_4)_2FeCy_6 + FeSO_4 =}$$
$$\mathrm{Fe(NH_4)_2FeCy_6 + CaSO_4}$$

The amount of calcium sulphate thus incidentally produced is ample for the purposes of my present invention, and rather more washing than is now usual in the manufacture of iron blues may be required to eliminate it, as well as other impurities.

In general, it may be said that with a minimum proportion of auxiliary material, a blue of the desired character may be initially produced, which would be satisfactory if quickly washed on a filter; but if this blue has to undergo considerable washing, as in washing by decantation, then it apparently deteriorates or reverts to the more colloidal condition of ordinary blues, and the ultimate product is of poorer quality. With larger proportions of auxiliary material, however, some calcium sulphate will remain present undissolved throughout the precipitation, the oxidation, and even the first decantations, in a finely divided solid form, and this will go into solution in the later decantations. Even an amount of calcium sulphate insufficient to saturate the water will protect the blue; and after all other impurities have been eliminated, the washing required to get rid of this final residue of protective calcium sulphate (as completely as commercially necessary, at any rate) will not cause or permit serious deterioration of the blue. Hence smaller proportions of auxiliary material than indicated above for the various conditions of washing generally give less satisfactory results. On the other hand, larger proportions of auxiliary material than indicated above seem to be of very little benefit,—except as they may protect the product against greater amounts of wash water than above indicated.

Taking molecular proportions of sodium ferrocyanide or calcium-ammonium ferrocyanide and of ferro sulphate (according to the equations given above) as a basis of reckoning, a small excess of ferrous sulphate may be used for bronze milori blue, a greater excess for Chinese blue, and a considerable excess for Prussian blue. For bronze milori blue, a substantial amount of non-oxidizing acid (e. g., hydrochloric or, preferably, sulphuric) is used in the ferrous sulphate solution; for Chinese blue, a less amount of acid; and for Prussian blue, little or no acid. The temperature of the solutions when and after they are brought together also influences the color of the product: i. e., the higher the temperature, the lighter the blue.

For the convenience of those desiring to practice my invention, I will now give examples of detailed procedure and formulae for particular shades of blue, first describing the use of calcium salts alone as auxiliary material, and then indicating proper modifications for the use of calcium and magnesium salts together.

(A) Chinese blue

In a tank equipped with a stirrer for agitation and with steam jets for steam injection to heat the contents, dissolve 100 lbs. sodium ferrocyanide ($Na_4FeCy_6 \cdot 10H_2O$) in 100 gallons of water. Raise the temperature to 40° C. by blowing in steam, and with good agitation, add as the calcium salt an amount of commercial calcium chloride equivalent to 12 lbs. of 100% $CaCl_2$; or, as an alternative, add either 15.7 lbs. plaster of Paris ($CaSO_4 \cdot \frac{1}{2}H_2O$) or 18.5 lbs. gypsum ($CaSO_4 \cdot 2H_2O$) ground very fine, so that at least 95% passes through a 200 mesh screen. Continuing the fairly vigorous agitation, run in gradually (in 15 minutes) a solution of 65 lbs. copperas ($FeSO_4 \cdot 7H_2O$) in 140 gallons of water, containing also 29 lbs. ammonium sulphate and 4 lbs. 66° Be. sulphuric acid. This solution should be at 80° C. when run in. By blowing in steam, raise the temperature of the resulting slurry to 80° C., and digest at this temperature for one hour, with moderate agitation. During the first thirty minutes of this digestion, add gradually 80 gallons of water heated to 80° C. After digesting for one hour, add a solution of 15 lbs. 66° sulphuric acid in 10 gallons of water, this solution being at 80° C. when added. Agitate moderately for 15 minutes, and then add the oxidizer consisting of 5 lbs. sodium chlorate dissolved in 5 gallons of water, this solution being at 80° C. when added. Hold at 80° C. for two hours with moderate agitation. Then make up to about 1000 gallons with water at ordinary temperature. Allow to settle thoroughly; decant the clear solution; and make up again with fresh water. When the blue has settled sufficiently, decant again and pump the blue into a filter press, and there wash until the filtrate is sufficiently free of acid and calcium sulphate.

In order to use calcium and magnesium salts together as auxiliary material, reduce the amount of calcium salt added to the sodium ferrocyanide solution to an amount of commercial calcium chloride equivalent to 2.2 lbs. of 100% $CaCl_2$, or to 3 lbs. plaster of Paris, or to 3.5 lbs. gypsum, as the case may be. In the copperas-ammonium sulphate-sulphuric acid solution, on the other hand, include also 5 lbs. commercial magnesium sulphate ($MgSO_4 \cdot 7H_2O$); or, as an alternative, 2 lbs. of commercial magnesium chloride ($MgCl_2$). Bring these solutions together, etc., all as already described to and including the addition of the oxidizer and the subsequent holding at 80° C. for two hours with agitation. Then, however, instead of making up to 1000 gallons with additional water, etc., proceed as follows: i. e., after holding at 80° C. for two hours, simply let stand without agitation over night, "as is",— without any further additions whatsoever,—and in the morning pump into a filter press and there wash until the filtrate is sufficiently free of acid and soluble salts.

In either case, dry the filter cake in the usual manner at a temperature of about 60° C. This may be done in tray driers at low temperature: e. g., starting at 50° C. and raising the temperature to 60° C. as the blue dries. Overheating should be avoided, as the blue will ignite spontaneously at about 100° C., especially when wet or moist.

(B) Bronze Milori blue

In a tank equipped with a stirrer for agitation and with steam jets for heating, dissolve 100 lbs. sodium ferrocyanide ($Na_4FeCy_6 \cdot 10H_2O$) in 100 gallons of water and heat to 50° C. Now add with good agitation an amount of commercial calcium chloride equivalent to 12 lbs. of 100% $CaCl_2$; or as an alternative, add either 15.7 lbs. plaster of Paris, or 18.5 lbs. gypsum ground very fine, so that at least 95% passes through a 200 mesh screen. Continuing the fairly vigorous agitation, run in gradually (in fifteen minutes) a solution of 60 lbs. copperas ($FeSO_4 \cdot 7H_2O$) in 120 gallons of water, containing also 29 lbs. ammonium sulphate and 5 lbs. 66° Be. sulphuric acid, this solution being at 90° C. when run in. After this is added, raise the temperature of the resulting slurry to 80° C., and then add 25 lbs. of 66° Be. sulphuric acid in 15 gallons of water. Now with moderate agitation run in, in 30 minutes, 80 gallons of water heated to 80° C., and continue digesting for two hours longer. Then add the oxidizer, consisting of 5 lbs. sodium chlorate dissolved in 5 gallons of water, this solution also being at 80° C. when added. Keep at 80° C. for two hours with moderate agitation. Then make up to 1000 gallons with water at ordinary temperature, and wash, filter-press, and dry, all as described above under (A) in connection with Chinese blue.

In order to use calcium and magnesium salts together as auxiliary material, make exactly the same changes in the procedure and ingredients just described as have been set forth above under (A) Chinese blue.

Other blues (Prussian, bronze, and soluble blues) may be made by varying the ingredients and conditions as indicated above, and as well understood by chemists skilled in the making of iron blues. In work on a smaller scale, it may be desirable to protect the hot agitated solutions from oxidation by an atmosphere of illuminating gas or other non-reactive gas above them, although this will not usually be necessary in work on a commercial scale such as described above.

I have herein referred to the use of various (more or less soluble) calcium and/or magnesium salts to provide sulphate in solution, and have particularly mentioned the reaction of such salts with ferrous sulphate or copperas. However, it is to be understood that while ferrous sulphate, when used, will usually be the most abundant source of sulphate ($SO_4$) ions in the solutions, yet sulphate ions from other ingredients or reagents such as ammonium sulphate and sulphuric acid, may likewise react with calcium and/or magnesium salts to form sulphates,—especially when ferrous salts other than copperas are used to react with the ferrous alkali ferrocyanide.

This application is a continuation in part of my pending application, Serial No. 669,560, filed May 5, 1933, as to common subject-matter described and claimed.

Having thus described my invention, I claim:

1. An improvement in making iron blues by a process involving reaction together in solution of a ferrous salt and an alkali ferrocyanide, with a resultant ferrous alkali ferrocyanide precipitate, and oxidation of this precipitate; which improvement comprises subjecting the precipitate, before the oxidation thereof, to the influence in the solution of the ions of a metal of the group consisting of magnesium and calcium, which does not itself react with the other ingredients aforementioned, nor with the desired product and afterwards eliminating a component containing these ions from the product.

2. An improvement in making iron blues by a process involving reaction together in solution of a ferrous salt and an alkali ferrocyanide, with a resultant ferrous alkali ferrocyanide precipitate, and oxidation of this precipitate; which improvement comprises subjecting the precipitate, before the oxidation thereof, to the influence in the solution of a metallic salt of the group consisting of magnesium and calcium which does not react with the other ingredients aforementioned, nor with the desired product, and afterward eliminating this salt from the product.

3. An improvement in making iron blues by a process involving reaction together of a ferrous salt and an alkali ferrocyanide with a resultant ferrous alkali ferrocyanide precipitate, oxidizing such precipitate, and washing out other reaction products from the oxidized precipitate; which improvement comprises carrying out the process in the effective presence of a metallic salt of the group consisting of magnesium and calcium which does not react with the other ingredients aforementioned, nor with the desired product, from a stage prior to oxidation until the final characteristics of the blue produced have become fixed, and afterward washing out this salt from the product.

4. An improvement in making iron blues by a process involving reaction together of a ferrous salt and an alkali ferrocyanide with a resultant ferrous alkali ferrocyanide precipitate, oxidizing such precipitate, and washing out other reaction products from the oxidized precipitate; which improvement comprises carrying out the process in the effective presence of calcium and magnesium salts which do not react with the other ingredients aforementioned, nor with the desired product, from a stage prior to oxidation until the final characteristics of the blue produced have become fixed, and afterward eliminating these salts from the product.

5. An improvement in making iron blues by a process involving reaction together of a ferrous salt and an alkali ferrocyanide with a resultant ferrous alkali ferrocyanide precipitate, oxidizing such precipitate, and washing out other reaction products from the oxidized precipitate; which improvement comprises carrying out the process in the effective presence of a calcium salt which does not react with the other ingredients aforementioned, nor with the desired product, from a stage prior to oxidation until the final characteristics of the blue produced have become fixed, and afterward eliminating this salt from the product.

6. An improvement in making iron blues by a process involving reaction together in solution of a ferrous salt and an alkali ferrocyanide with a resultant ferrous alkali ferrocyanide precipitate, oxidizing such precipitate, and washing out other reaction products from the oxidized precipitate and thus purifying the latter; which improvement comprises subjecting the precipitate, before the oxidation thereof, to the influence in the solution of a metallic salt of the group consisting of magnesium and calcium which does not react with the other ingredients aforementioned, nor with the desired product, and thereafter protecting it by the presence of calcium sulphate during oxidation and the washing out of impurities as aforesaid, and finally eliminating the calcium sulphate from the product.

7. An improvement in making iron blues by a process involving reaction together in solution of a ferrous salt and an alkali ferrocyanide with a resultant ferrous alkali ferrocyanide precipitate, oxidizing such precipitate, and washing out other reaction products from the oxidized precipitate and thus purifying the latter; which improvement comprises subjecting the precipitate, before the oxidation thereof, to the influence in the solution of calcium and magnesium salts which do not react with the other ingredients aforementioned, nor with the desired product, and thereafter protecting it by the presence of the calcium salt during oxidation and the washing out of impurities as aforesaid, and finally washing out such calcium salt.

8. An improvement in making iron blues by a process involving reaction together in solution of a ferrous salt and an alkali ferrocyanide with a resultant ferrous alkali ferrocyanide precipitate, oxidizing such precipitate, and washing out other reaction products from the oxidized precipitate and thus purifying the latter; which improvement comprises subjecting the precipitate, before the oxidation thereof, to the influence in the solution of a magnesium salt which does not react with the other ingredients aforementioned, nor with the desired product, and thereafter protecting it by the presence of the magnesium salt during oxidation and the washing out of impurities as aforesaid, and finally washing out such magnesium salt.

9. An improvement in making iron blues by a process involving reaction together of a ferrous salt and an alkali ferrocyanide, with a resultant ferrous alkali ferrocyanide precipitate and oxidation of such precipitate, which improvement comprises precipitating the ferrous alkali ferrocyanide in the effective presence of a metallic salt of the group consisting of magnesium and calcium which does not react with the other ingredients aforementioned, nor with the desired product, and afterward eliminating such salt from the product.

10. An improvement according to claim 9 wherein the solution is vigorously agitated until it thickens to a slurry, and thereafter more moderately agitated during further progress of the reaction.

11. An improvement in making iron blues by a process involving reaction together of a ferrous salt and an alkali ferrocyanide, with a resultant ferrous alkali ferrocyanide precipitate and oxidation of such precipitate, which improvement comprises precipitating the ferrous alkali ferrocyanide in the effective presence of a calcium salt which does not react with the other ingredients aforementioned, nor with the desired product, and afterward eliminating this salt from the product.

12. An improvement in making iron blues by a process involving reaction together of a ferrous salt and an alkali ferrocyanide, with a resultant ferrous alkali ferrocyanide precipitate and oxidation of such precipitate, which improvement comprises precipitating the ferrous alkali ferrocyanide in the effective presence of a magnesium salt which does not react with the other ingredients aforementioned, nor with the desired product, and afterward eliminating this salt from the product.

13. An improvement in making iron blues by a process involving reaction together in solution of ferrous sulphate and an alkali ferrocyanide, with a resultant ferrous alkali ferrocyanide precipitate and oxidation of such precipitate; which improvement comprises bringing the ferrous salt and the alkali ferrocyanide together in an amount of water such as to be thickened into a slurry at a comparatively early stage of the reaction, and gradually adding more water as the reaction proceeds.

14. An improvement in making iron blues by a process involving reaction together in solution of ferrous sulphate and an alkali ferrocyanide, with a resultant ferrous alkali ferrocyanide precipitate, and oxidation of such precipitate; which improvement comprises bringing the ferrous salt and the alkali ferrocyanide together in the presence of a metallic salt of the group consisting of magnesium and calcium which does not react with the other ingredients aforementioned, nor with the desired product, with an amount of water such as to be thickened into a slurry at a comparatively early stage of the reaction, and gradually adding more water as the reaction proceeds.

15. An improvement in making iron blues by a process involving reaction together in solution of ferrous sulphate and an alkali ferrocyanide, with a resultant ferrous alkali ferrocyanide precipitate, and oxidation of such precipitate; which improvement comprises bringing the ferrous salt and the alkali ferrocyanide together in the presence of a metallic salt of the group consisting of magnesium and calcium which does not react with the other ingredients aforementioned, nor with the desired product, with an amount of water such as to be thickened into a slurry at a comparatively early stage of the reaction, and gradually adding more water as the reaction proceeds, until the total volume of the batch is 30% to 50% in excess of its initial volume.

16. An improvement in making iron blues by a process involving reaction together in solution of ferrous sulphate and an alkali ferrocyanide, with a resultant ferrous alkali ferrocyanide precipitate, and oxidation of this precipitate; which improvement comprises introducing into the solution, before the oxidation of the precipitate, a soluble metallic salt of the group consisting of magnesium and calcium which does not react with the other ingredients aforementioned, and whose acid radical is substantially inert toward the other ingredients as well as toward the ferrous alkali ferrocyanide precipitate, to coact with sulphate ions in the solution as sulphate; and afterward washing out this sulphate from the product.

17. An improvement according to claim 16, wherein the soluble salt introduced into the solution as set forth is a ferrocyanide.

18. An improvement in making iron blues by a process involving reaction together in solution of ferrous sulphate and an alkali ferrocyanide, with a resultant ferrous alkali ferrocyanide precipitate, and oxidation of this precipitate; which improvement comprises introducing into the solution, before the oxidation of the precipitate, soluble calcium and magnesium salts whose acid radical(s) are substantially inert toward the other ingredients as well as toward the ferrous alkali ferrocyanide precipitate, to coact with sulphate ions in the solution as sulphates; and afterward washing out these sulphates from the product.

19. A method of protecting an alkali iron blue from deterioration during washing with water to dissolve out impurities remaining from earlier stages of manufacture, which method comprises washing the blue as aforesaid in the effective presence of magnesium sulphate, and afterward washing out the magnesium sulphate from the blue.

20. An improvement in making iron blues by a process involving reaction together in solution of a ferrous salt and an alkali ferrocyanide, with a resultant ferrous alkali ferrocyanide precipitate, and oxidation of this precipitate; which improvement comprises subjecting the precipitate, before the oxidation thereof, to the influence of calcium sulphate in the solution, and afterward eliminating the calcium sulphate from the product.

21. An improvement in making iron blues by a process involving reaction together in solution of a ferrous salt and an alkali ferrocyanide, with a resultant ferrous alkali ferrocyanide precipitate, and oxidation of this precipitate; which improvement comprises subjecting the precipitate, before the oxidation thereof, to the influence of magnesium sulphate in the solution, and afterward eliminating the magnesium sulphate from the product.

22. An improvement in making iron blues by a process involving reaction together of a ferrous salt and an alkali ferrocyanide with a resultant ferrous alkali ferrocyanide precipitate, oxidizing such precipitate, and washing out other reaction products from the oxidized precipitate; which improvement comprises carrying out the process in the effective presence of calcium sulphate from a stage prior to oxidation until the final characteristics of the blue produced have become fixed, and afterward washing out the calcium sulphate from the product.

23. An improvement in making iron blues by a process involving reaction together of a ferrous salt and an alkali ferrocyanide with a resultant ferrous alkali ferrocyanide precipitate, oxidizing such precipitate, and washing out other reaction products from the oxidized precipitate; which improvement comprises carrying out the process in the effective presence of magnesium sulphate from a stage prior to oxidation until the final characteristics of the blue produced have become fixed, and afterward washing out the magnesium sulphate from the product.

SAMUEL FELTON GROVE.